(12) United States Patent
Bahrebar et al.

(10) Patent No.: US 10,164,282 B2
(45) Date of Patent: Dec. 25, 2018

(54) MICROBIAL FUEL CELLS AND METHODS FOR GENERATING AN ELECTRIC CURRENT

(71) Applicants: Soheil Bahrebar, Tehran (IR); Ali Mehdinia, Tehran (IR)

(72) Inventors: Soheil Bahrebar, Tehran (IR); Ali Mehdinia, Tehran (IR)

( * ) Notice: Subject to any disclaimer, the term of this patent is extended or adjusted under 35 U.S.C. 154(b) by 167 days.

(21) Appl. No.: 15/350,093

(22) Filed: Nov. 13, 2016

(65) Prior Publication Data

US 2018/0138537 A1    May 17, 2018

(51) Int. Cl.
| | |
|---|---|
| H01M 8/16 | (2006.01) |
| H01M 4/90 | (2006.01) |
| H01M 4/92 | (2006.01) |
| H01M 8/1023 | (2016.01) |

(52) U.S. Cl.
CPC ........... *H01M 8/16* (2013.01); *H01M 4/9008* (2013.01); *H01M 4/9083* (2013.01); *H01M 4/926* (2013.01); *H01M 8/1023* (2013.01)

(58) Field of Classification Search
None
See application file for complete search history.

(56) References Cited

U.S. PATENT DOCUMENTS

| | | | | |
|---|---|---|---|---|
| 9,825,309 B2* | 11/2017 | Liu | ..................... | H01M 8/0239 |
| 2010/0310945 A1* | 12/2010 | Premier | .................. | H01M 8/16 |
| | | | | 429/401 |
| 2010/0330397 A1* | 12/2010 | Fukase | ................ | H01M 8/0232 |
| | | | | 429/2 |
| 2011/0143224 A1* | 6/2011 | Rittmann | .................. | C25B 1/02 |
| | | | | 429/401 |
| 2011/0236769 A1* | 9/2011 | Xie | ......................... | B82Y 30/00 |
| | | | | 429/401 |
| 2011/0311887 A1* | 12/2011 | He | .......................... | C02F 3/005 |
| | | | | 429/401 |
| 2012/0082868 A1* | 4/2012 | Huang | .................. | H01M 8/004 |
| | | | | 429/2 |

(Continued)

FOREIGN PATENT DOCUMENTS

CN             104810530 A   *  7/2015

OTHER PUBLICATIONS

CN-104810530—A machine English translation of Abstract (Year: 2015).*

*Primary Examiner* — Scott J. Chmielecki

(57) ABSTRACT

A microbial fuel cell and a method for generating an electric current using the microbial fuel cell are disclosed. The microbial fuel cell comprises a housing provided with multiple cell compartments. The cell compartments includes an anode compartment having an anode in a side, and a cathode compartment having a cathode on another side separated by an ion exchange membrane. The anode is a carbon cloth modified with a graphene electrode comprising high-surface-area graphene nanoparticles attached to a biocatalyst. The cathode is a carbon cloth modified with a platinum electrode immersed in a medium. The anode and cathode are electrically connected to one another via a resistance to generate electricity. The large specific surface area and biocompatibility of the graphene anode in the microbial fuel cell increases the bacterial biofilm formation and charge transfer efficiency.

15 Claims, 3 Drawing Sheets

(56) References Cited

U.S. PATENT DOCUMENTS

| | | | | |
|---|---|---|---|---|
| 2013/0302703 A1* | 11/2013 | Bretschger | ............... | H01M 8/16 429/401 |
| 2014/0315046 A1* | 10/2014 | Yoshida | ................ | H01M 8/16 429/2 |
| 2017/0218530 A1* | 8/2017 | Bouchez | ................ | C25B 15/02 |
| 2018/0016169 A1* | 1/2018 | Suzuki | ................ | C02F 3/005 |

\* cited by examiner

MICROBIAL FUEL CELLS AND METHODS FOR GENERATING AN ELECTRIC CURRENT

BACKGROUND OF THE INVENTION

Generally, a microbial fuel cell (MFC) is a device that converts chemical energy to electrical energy by the action of microorganisms. The microbial fuel cell (MFC), which is also termed as bio-batteries or biological fuel cells, utilize catalysts such as bacteria for oxidizing organic and inorganic matters to generate an electrical current. The electrons produced by the bacteria through oxidation of the organic and inorganic matters are transferred to an anode or a negative pole, and then flows by a conductive material including a resistance to a cathode or a positive pole. By convection, a positive current from the positive pole is established to the negative pole, opposite of an electron current. Bio-batteries are constructed in different configurations with different materials.

The limited output of electrical power is a major limitation faced by the MFC. One of the main factors affecting the existing MFC is the type of materials used for the electrodes, type of catalyst and fuels. Habermnan and Pommer have constructed a biological cell with cobalt oxide and alloy of molybdenum/vanadium electrode, hydrogen sulfide as fuel generating output power of 150 mA/m². Capodaglio et al. utilized municipal waste as a fuel, and the carbon cloth with a steel belt was used as the anode, generating output power of 13 mW/m³. In general, bio batteries with several different fuels and anodes were made so far, generated low output power of 30-150 mW/m².

Although different materials have been utilized for making anodes and cathodes, the existing known materials implemented in the electrodes still provide lower power densities, and generating low electrical current when compared to the other existing fuel cells.

Therefore, there is a need in an art for increasing power density, and providing stable power supply using an economical fuel and generally available microorganism in the microbial fuel cells. There is also a need for simple, efficient, economical and biocompatible construction in the microbial fuel cell.

SUMMARY OF THE INVENTION

The present invention relates to a microbial fuel cell and a method for generating an electric current using the microbial fuel cell. In an embodiment, the microbial fuel cell comprises a housing having one or more cell compartments. The cell compartments includes an anode compartment having an anode in a side, and a cathode compartment having a cathode on another side separated by an ion exchange membrane. In one embodiment, the anode is a carbon cloth modified with a graphene electrode comprising high-surface-area graphene nanoparticles attached to a biocatalyst. In one embodiment, the cathode is a carbon cloth modified with a platinum electrode immersed in a medium. In an embodiment, the anode and cathode are electrically connected to one another via a resistance to generate electricity.

In one embodiment, the housing is a H-shaped glass cell comprising anode compartment and cathode compartment separated by the ion exchange membrane. In one embodiment, the ion exchange membrane is a cation exchange membrane. In another embodiment, the cation exchange membrane is a sulfonated tetrafluoroethylene based fluoropolymer-copolymer.

One aspect of the present disclosure is directed to a microbial fuel cell. The microbial fuel cell comprises a housing comprising one or more cell compartments with an anode compartment having an anode in a side, and a cathode compartment having a cathode on another side separated by an ion exchange membrane; wherein the anode is a carbon cloth modified with a graphene electrode comprising high-surface-area graphene nanoparticles attached to a biocatalyst, and the cathode is a carbon cloth modified with a platinum electrode immersed in a medium, and the anode and cathode are electrically connected to one another via a resistance to generate electricity. Another aspect of the present disclosure is directed to a method for generating an electric current, comprising providing the microbial cell as described above, and introducing a culture medium and a nutrient medium to the anode compartment of the microbial fuel cell.

In an embodiment, the cell compartment is filled with a culture medium comprising a carbon and a phosphorous source ranges from 55% to 65% volume of the housing. In one embodiment, the cathode compartment is filled with a solution comprising potassium ferricyanide. In one embodiment, the anode compartment is filled with a solution comprising glucose. In an embodiment, the biocatalyst comprises a plurality of *Escherichia coli* bacteria. In one embodiment, the bacteria is attached to the anode oxidize the glucose in the anode compartment. In an embodiment, the microbial fuel cell further comprises power density greater than 600 mW/m².

In an embodiment, a method for generating an electric current comprises a step for providing the microbial fuel cell. In one embodiment, the method further comprises a step for introducing a culture medium and a nutrient medium to the anode compartment of the microbial fuel cell. In one embodiment, the culture medium comprises carbon and phosphorous source ranges from 55% to 65% volume of the housing. In another embodiment, the nutrient medium comprises glucose. In an embodiment, the method further comprises aerating the anode compartment with nitrogen gas for 10 minutes for creating an anaerobic environment.

In an embodiment, the biocatalyst is attached to the anode oxidizes the glucose in the anode compartment. In another embodiment, the exchange of ions is done via the ion exchange membrane in the anode compartment and the cathode compartment of the housing.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention generally relates to microbial fuel cell, and more specifically the invention relates to increase the power density of the microbial fuel cell using high-surface-area graphene nanoparticles.

One aspect of the present disclosure is directed to a microbial fuel cell. The microbial fuel cell comprises a housing comprising one or more cell compartments with an anode compartment having an anode in a side, and a cathode compartment having a cathode on another side separated by an ion exchange membrane; wherein the anode is a carbon cloth modified with a graphene electrode comprising high-surface-area graphene nanoparticles attached to a biocatalyst, and the cathode is a carbon cloth modified with a platinum electrode immersed in a medium, and the anode and cathode are electrically connected to one another via a resistance to generate electricity.

In one embodiment, the housing is a H-shaped glass cell comprising anode compartment and cathode compartment separated by the ion exchange membrane. In another embodiment, the ion exchange membrane is a cation exchange membrane. In one embodiment, the cation exchange membrane is a sulfonated tetrafluorethylene based fluoropolymer-copolymer. In one embodiment, the cell compartment is filled with a culture medium comprising a carbon and a phosphorous source ranges from 55% to 65% volume of the housing.

In one embodiment, the anode compartment is filled with a solution comprising glucose. In another embodiment, the cathode compartment is filled with a solution comprising potassium ferricyanide. In one embodiment, the biocatalyst comprises a plurality of *Escherichia coli* bacteria. In a related embodiment, the bacteria is attached to the anode oxidize the glucose in the anode compartment. In one embodiment, the microbial fuel cell further comprises power density greater than 600 mW/m2.

Figure 1:
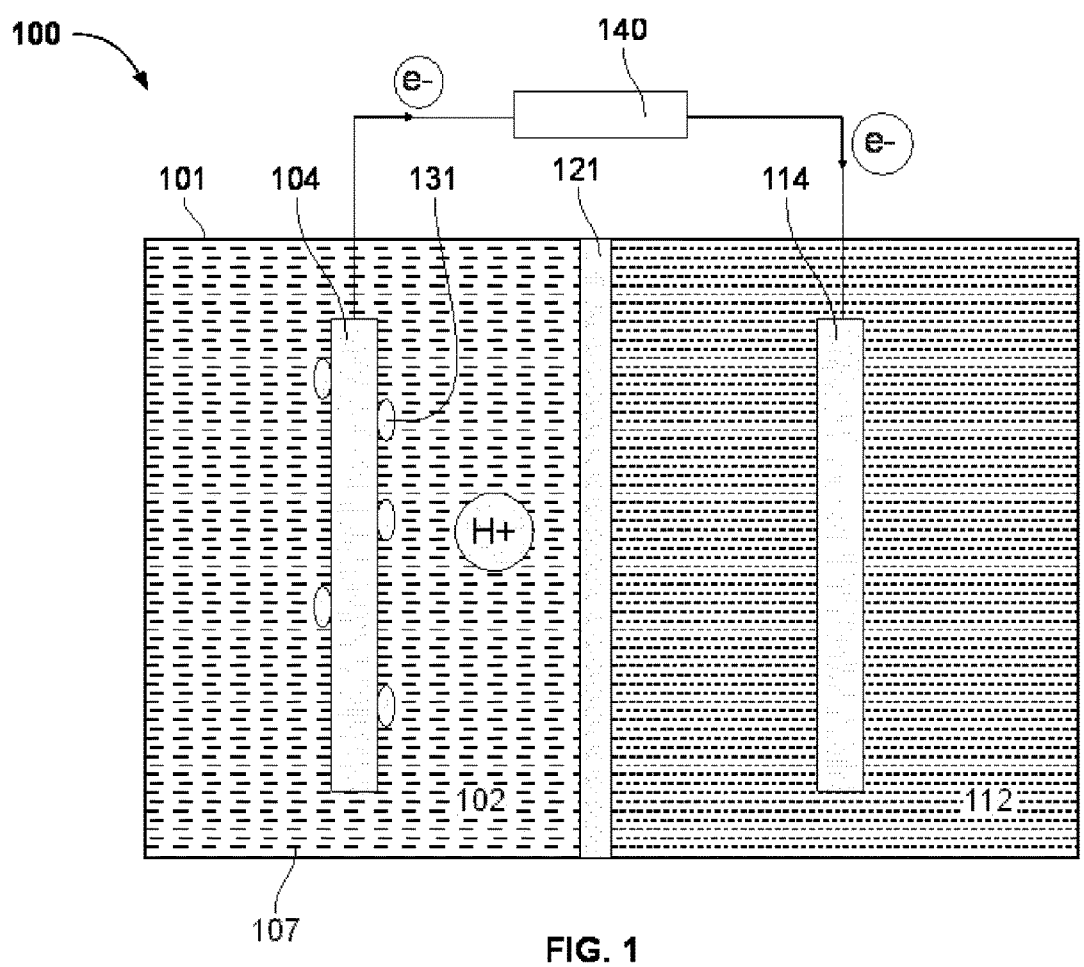
FIG. 1 illustrates a schematic view of a microbial fuel cell according to an embodiment.

The present invention relates to a microbial fuel cell and a method for generating an electric current using the microbial fuel cell. Referring to FIG. 1, a microbial fuel cell 100 comprises a housing 101 having one or more cell compartments. The cell compartments includes an anode compartment 102 having an anode 104 in a side, and a cathode compartment 112 having a cathode 114 on another side separated by an ion exchange membrane 121. In one embodiment, the anode 104 is a carbon cloth modified with a graphene electrode comprising high-surface-area graphene nanoparticles attached to a biocatalyst 131 in a medium. In one embodiment, the surface area of the graphene nanoparticles is greater than 2500 $m^2/g$. In one embodiment, the cathode 114 is a carbon cloth modified with a platinum electrode immersed in the medium. In an embodiment, the anode 104 and cathode 114 are electrically connected to one another via a resistance 140 to generate electricity.

In one embodiment, the housing 101 is an H-shaped glass cell comprising anode compartment 102 and cathode compartment 112 separated by the ion exchange membrane 121. In one embodiment, the ion exchange membrane 121 is a cation or proton ($H^+$) exchange membrane. In another embodiment, the cation or proton ($H^+$) exchange membrane is a Nafion membrane or sulfonated tetrafluorethylene based fluoropolymer-copolymer.

In an embodiment, the housing 101 comprises cell compartments are filled with a culture medium comprising a carbon and a phosphorous source ranges from 55% to 65% volume. In one embodiment, the housing 101 comprises cell compartments are filled with a culture medium comprising a carbon and a phosphorous source of 60% volume. In one embodiment, the cathode compartment 112 is filled with a solution comprising potassium ferricyanide ($K_3Fe(CN)_6$).

Referring to FIG. 1, the anode compartment 102 is filled with a solution comprising glucose 107. In one embodiment, the anode compartment 102 is aerated with nitrogen gas for 10 min, providing an anaerobic environment. In an embodiment, the microorganism from the adapted microbial population of 0.1 ml is added in the anode compartment 102 as a biocatalyst 131. In one embodiment, the biocatalyst 131 comprises a plurality of *Escherichia coli* bacteria. In one embodiment, the bacteria is attached to the anode 104 oxidize the glucose 107 in the anode compartment 102. In an embodiment, the microbial fuel cell 100 generates power density greater than 600 $mW/m^2$. In one embodiment, the higher power density is generated by connecting multiple microbial fuel cells 100 in series.

In an embodiment, a method for generating an electric current comprises a step for providing the microbial fuel cell 100 shown in FIG. 1. In one embodiment, the method further comprises a step for introducing a culture medium, or a nutrient medium to the anode compartment of the microbial fuel cell. In one embodiment, the culture medium comprises carbon and phosphorous source ranges from 55% to 65% volume of the housing. In another embodiment, the nutrient medium comprises glucose 107. In an embodiment, the method further comprises aerating the anode compartment with nitrogen gas for 10 minutes for creating an anaerobic environment.

In an embodiment, the biocatalyst 131 is attached to the anode oxidizes the glucose 107 in the anode compartment. In another embodiment, the exchange of ions is done via the ion exchange membrane 121 in the anode compartment 102 and the cathode compartment 112 of the housing 101.

The microbial fuel cell (MFC) 100 according to the present invention enhances the power density without the use of toxic chemicals, developed by using high-surface area graphene nanoparticles as the anode 102. Graphene also represents an approving property for the anode materials in the MFCs 100. The improved performance of the MFC 100 is due to the large specific surface area of the graphene, and good biocompatibility, which increases the bacterial biofilm formation and charge ($e^-$) transfer efficiency. The MFC 100 could be used as a power source for temperature and humidity sensors, which requires low energy source. It is also used for wastewater treatment by oxidizing organic matters in the wastewater by the biocatalyst 131 such as bacteria. It could be used for different sensors with low power requirement in the sub-sea, or other places as a replacement for other power sources such as batteries.

Another aspect of the present disclosure is directed to a method for generating an electric current, comprising providing the microbial cell as described above, and introducing a culture medium and a nutrient medium to the anode compartment of the microbial fuel cell. In one embodiment, the culture medium comprises carbon and phosphorous source ranges from 55% to 65% volume of the housing. In another embodiment, the nutrient medium comprises glucose. In one embodiment, the method further comprises aerating the anode compartment with nitrogen gas for 10 minutes. In one embodiment, the biocatalyst is attached to the anode oxidizes the glucose in the anode compartment. In one embodiment, the exchange of ions is done via the ion exchange membrane in the anode compartment and the cathode compartment of the housing.

The invention is further explained in the following examples, which however, are not to be construed to limit the scope of the invention.

EXAMPLES

Example-1

In an experiment, an H-shaped glass cell was used as the cell compartment, and the anode and cathode were made of carbon cloth modified with graphene and platinum electrode. Nafion 117 sheets (DuPont) were used as cation exchange membrane. The cell compartment was filled with a culture medium containing carbon and phosphorus source at about 60% of volume tank. The microorganisms from the adapted microbial population (0.1 ml) was added to it. Calomel reference electrode $HgCl_2/Hg$ and working electrode were placed in the anode compartment. The anode chamber was aerated with nitrogen gas for 10 min and an anaerobic environment was provided. The cathode reservoir was filled with a solution of 1.0 $K_3Fe(CN)_6$. The electrical polarization and power density studies were studied by a micro-AUTOLAB III (Ecochemie, Netherlands). In the prepared design, graphene-based anode was connected to platinum cathode by a resistance. The proton ($H^+$) exchange was performed from a Nafion membrane and bacteria attached to the anode oxidizes the glucose.

Example-2

Figure 2:
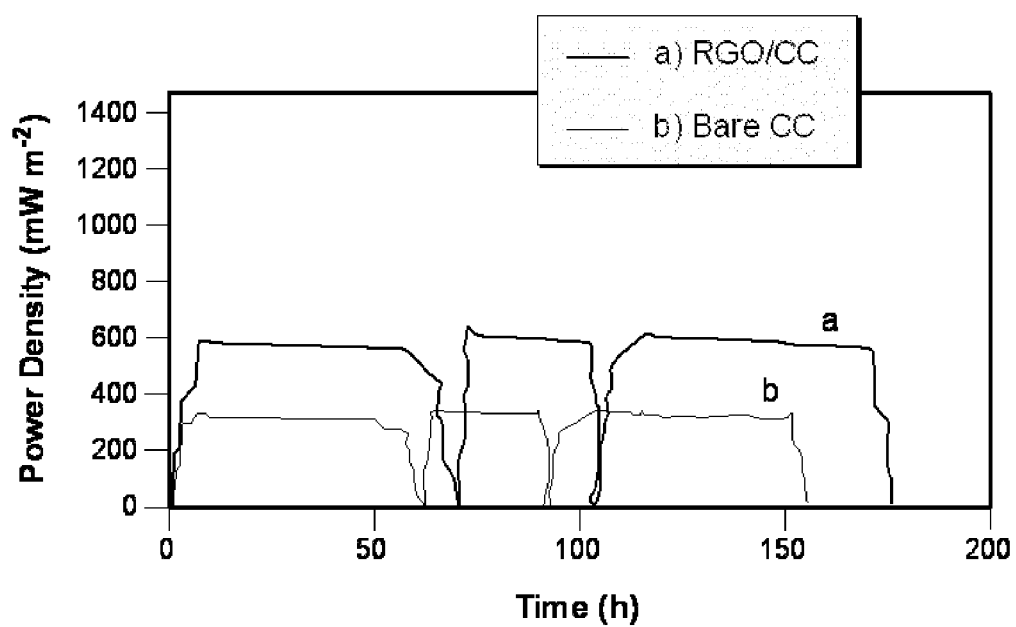
FIG. 2 illustrates a graph comparing power density output of the MFCs with carbon cloth modified with graphene (RGO/CC) anode and bare carbon cloth (CC) anode according to an embodiment.

To assess the effect of modification of anode by graphene in MFCs, polarization tests were used to determine the overall performance of the modified anodes. A MFC anode with a platinum (Pt) rod cathode was designed for evaluating the discharge performance of the different anodes. The performances of two types a) carbon cloth modified with graphene (RGO/CC) and b) bare carbon cloth (CC) of the nodes were recorded simultaneously with an external resistance of 550 ohm. Referring to FIG. 2, the maximum power densities of the MFC with the RGO/CC anode reached to 600 $mW/m^2$, after 2 to 3 days of operation. The maximum power density obtained was 1.8 times higher than that of the bare CC.

Figure 3:
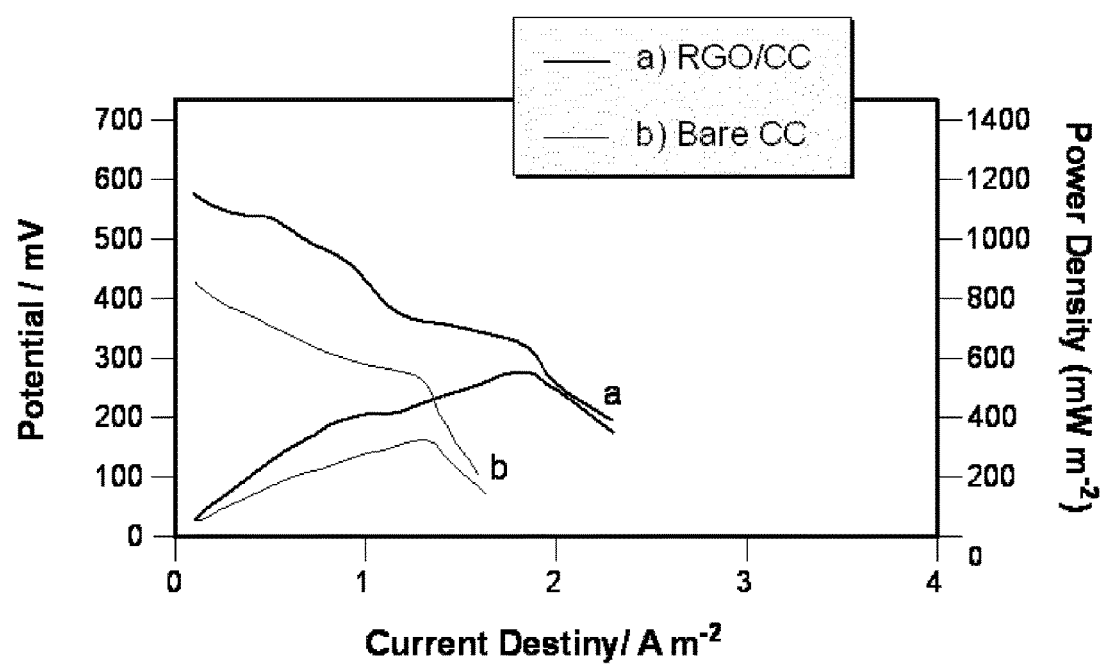
FIG. 3 illustrates a graph comparing polarization curves of the MFCs with RGO/CC anode and bare CC anode according to an embodiment.

Referring to FIG. 3, the open circuit voltage (OCV) of the RGO/CC anode was 0.57 V, which was larger than that of the CC anode. The OCV is dependent on the both biological and electrochemical processes in the MFC. Accordingly, all parameters were identical except the type of anode material. The OCV differences could be attributed to the performance of the anode. Several parameters could influence the electrode over potential, including electrode surface, electrochemical characteristics of the electrode, mechanism of electron ($e^-$) transfer, etc. Activation losses could be occurred when the electron ($e^-$) are transferred to the electrode surface. Here, the reduction of activation losses resulting from RGO modification plays a crucial role in the reduction of anode over potential.

Example-3

Referring to FIG. 3, the RGO/CC anode delivered a maximum power density of 590 $mW/m^2$ at a current density of 1.8 $A/m^2$ and a cell voltage of 328 mV. The bare CC anodes delivered a maximum power density of 338 $mW/m^2$ at a current density of 1.3 $A/m^2$ and a cell voltage of 260 mV. Therefore, the RGO/CC anode increased the MFCs power output up to 1.7 time than the bare CC anode.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A microbial fuel cell, comprising: a housing comprising one or more cell compartments with an anode compartment having an anode in a side, and a cathode compartment having a cathode on another side separated by an ion exchange membrane; wherein the anode is a carbon cloth modified with a graphene electrode comprising high-surface-area graphene nanoparticles attached to a biocatalyst, wherein the surface of the graphene nanoparticle is greater than 2500 $m^2/g$, and the cathode is a carbon cloth modified with a platinum electrode immersed in a medium, and the anode and cathode are electrically connected to one another via a resistance to generate electricity, wherein the power density of the microbial fuel cell is 600 $mW/m^2$.

2. The microbial fuel cell of claim 1, wherein the housing is a H-shaped glass cell comprising anode compartment and cathode compartment separated by the ion exchange membrane.

3. The microbial fuel cell of claim 1, wherein the ion exchange membrane is a cation exchange membrane.

4. The microbial fuel cell of claim 3, wherein the cation exchange membrane is a sulfonated tetrafluorethylene based fluoropolymer-copolymer.

5. The microbial fuel cell of claim 1, wherein the anode cell compartment is filled with a culture medium comprising a carbon source and a phosphorous source and ranges from 55% to 65% volume of the housing.

6. The microbial fuel cell of claim 1, wherein the anode compartment is filled with a solution comprising glucose.

7. The microbial fuel cell of claim 1, wherein the cathode compartment is filled with a solution comprising potassium ferricyanide.

8. The microbial fuel cell of claim 1, wherein the biocatalyst comprises a plurality of *Escherichia coli* bacteria.

9. The microbial fuel cell of claim 8, wherein the bacteria that is attached to the anode oxidize the glucose in the anode compartment.

10. A method for generating an electric current, comprising:
   providing the microbial fuel cell of claim 1, and
   introducing a culture medium and a nutrient medium to the anode
   compartment of the microbial fuel cell.

11. The method of claim 10, wherein the culture medium comprising a carbon source and a phosphorous source and ranges from 55% to 65% volume of the housing.

12. The method of claim 10, wherein the nutrient medium comprises glucose.

13. The method of claim 10, further comprising aerating the anode compartment with nitrogen gas for 10 minutes.

14. The method of claim 10, wherein the biocatalyst that is attached to the anode oxidizes the glucose in the anode compartment.

15. The method of claim 10, wherein the exchange of ions is done via the ion exchange membrane in the anode compartment and the cathode compartment of the housing.

\* \* \* \* \*